United States Patent
Llorente Gonzalez et al.

(10) Patent No.: US 7,729,100 B2
(45) Date of Patent: Jun. 1, 2010

(54) LIGHTNING CONDUCTOR SYSTEM FOR WIND GENERATOR BLADES COMPRISING CARBON FIBRE LAMINATES

(75) Inventors: Jose Ignaico Llorente Gonzalez, Pamplona (ES); Sergio Velez Oria, Pamplona (ES)

(73) Assignee: Gamesa Innovation & Technology, S.L., Navarra (ES)

( * ) Notice: Subject to any disclaimer, the term of this patent is extended or adjusted under 35 U.S.C. 154(b) by 110 days.

(21) Appl. No.: 11/663,013

(22) PCT Filed: Nov. 10, 2005

(86) PCT No.: PCT/ES2005/070156
§ 371 (c)(1),
(2), (4) Date: Mar. 15, 2007

(87) PCT Pub. No.: WO2006/051147
PCT Pub. Date: May 18, 2006

(65) Prior Publication Data
US 2008/0073098 A1    Mar. 27, 2008

(51) Int. Cl.
*H05F 3/02* (2006.01)
*B64D 45/02* (2006.01)
*F03D 11/02* (2006.01)

(52) U.S. Cl. .................. 361/220; 244/1 A; 416/229 R; 416/230

(58) Field of Classification Search .................. 361/220; 244/1 A; 416/229 R, 230
See application file for complete search history.

(56) References Cited

U.S. PATENT DOCUMENTS

| | | | |
|---|---|---|---|
| 6,102,662 A | 8/2000 | Bost et al. | |
| 6,320,118 B1 * | 11/2001 | Pridham et al. | 174/2 |
| 6,457,943 B1 * | 10/2002 | Olsen et al. | 416/230 |
| 6,612,810 B1 * | 9/2003 | Olsen et al. | 416/95 |
| 2006/0280613 A1 * | 12/2006 | Hansen | 416/230 |

FOREIGN PATENT DOCUMENTS

| | | | |
|---|---|---|---|
| EP | 0 580 417 | | 1/1994 |
| JP | 2004185983 A | * | 7/2004 |
| WO | 00/14405 | | 3/2000 |
| WO | 00/79128 | | 12/2000 |
| WO | 2 161 196 | | 11/2001 |
| WO | 03/008800 | | 1/2003 |
| WO | 2005/026538 | | 3/2005 |
| WO | 2005/050808 | | 6/2005 |

* cited by examiner

*Primary Examiner*—Stephen W Jackson
*Assistant Examiner*—Scott Bauer
(74) *Attorney, Agent, or Firm*—Ladas and Parry LLP

(57) ABSTRACT

Lightning protection system of wind turbine blades formed by various connections arranged on carbon fibre laminates (2) of the blade (1), equipotentialising the surface of the airfoils (4) of the beam (10) via derivations from a main cable (6) using the respective auxiliary cables (5). The auxiliary cables are connected to metal plates (3) which make the direct connection with the carbon fibre laminates (2) and are positioned during the blade (1) laminating and curing process, or they are connected to metal pins, preferably cone shaped, which pass through the hybrid laminate. Around the connections a nano-composite based conductive resin (11) is arranged. In the case of a hybrid laminate with layers of carbon fibre and layers of fibre glass, the equipotential state of the different layers is achieved using windows, discontinuities or open spaces in the fibreglass layers.

6 Claims, 3 Drawing Sheets

LIGHTNING CONDUCTOR SYSTEM FOR WIND GENERATOR BLADES COMPRISING CARBON FIBRE LAMINATES

THE SUBJECT OF THE PATENT

The subject of the patent is a lightning protection system for transmission and reception of lightning in wind turbine blades. An important characteristic is that part of the blade is a carbon fibre laminate.

BACKGROUND OF THE INVENTION

The inclusion of carbon fibre in the manufacturing of wind turbine blades is quite new and although its use is fairly extensive amongst the most important companies in the sector, the experience in relation to the method used for protection against lightning is still fairly limited and there is no general knowledge of any technique whose efficacy has been demonstrated.

Both the regulations applicable to wind turbines and existing literature on the subject, speak of an efficient method of protecting fibre glass blades against lightning consisting of a lightning protection system based on occasional receptors located along the length of the blade and a cable which connects said receptors to the blade root and passes through its interior.

In this sense the following patent can be quoted WO 96/07825 which presents a "Lightning protection for wind turbine blades" comprising an electrical conductor which extends from the tip of the blade travelling through the inside of the blade and ending at the blade root in a pin rod which allows the turning of the blade. The conductor will be with or without insulated covering and contributes to the support of the blade itself.

From WO 0177527 a blade is known which presents a protection against lightning with internal and external conductors, connected to each other and distributed along the whole blade. It also presents a series of penetration points and a pair of configurations for the tip and the rest of the blade.

U.S. Pat. No. 6,612,810 presents a protection whereby the blade comprises a pair of conductors extended lengthways along the surface of the blade (it also incorporates anti-ice heating elements). The blade tip has an impact receptor connected to a third conductor which runs through the inside of the blade. All conductors and heaters are connected to each other.

Existing literature on the impacts of lightning also state the need for equipotentialising the object which will receive the impact with the lightning protection system. In other words, in order for all elements to be at the same potential they must be electrically connected by conductors located on the area to be protected.

Carbon fibre, as a conducting material, must be kept equipotential with the lightning protection system. The problem with leaving conductor elements insulated is the high difference in potential which is created between them due to induction phenomena caused by the lightning when it passes through the lightning protection system. This difference in potential may give rise to arcing, which could be fatal in the case concerning us where the carbon fibre laminate constitutes the main resistant part of the blade.

There are different metal mesh based systems which attempt to prevent any intervention of the carbon fibre compound in the potential differences problem yet none of them have been shown to be efficient at solving the problem.

DESCRIPTION

The lightning protection system on blades consisting of carbon fibre laminates, which the is subject of the present invention, employs the lightning protection system based on a main cable to which other derivations are added to connect it directly to the carbon fibre laminates, using this method we ensure that both systems are equipotential.

It is also the subject of this invention to present a new method for improving the electrical characteristics of the connections in the lightning protection system of a blade between the main cable and the carbon fibre laminates of the blade. The method consists of applying a nanocomposite based conductive resin around or close to the connection in a controlled manner. Using this method, optimum electrical characteristics are obtained for correct operation of the blade lightning protection system.

One particular embodiment may consist of two connections to each of the two laminates, said laminates are arranged on the two faces which are stuck facing the blade shells called airfoils. The connections are made, one at the beam root area and the other at the tip area, in such a way that the airfoils of the beam become alternative lightning routes.

The system used has a differentiating characteristic, the method of making the connections between the main cable and the carbon laminates, using derivations from the main cable thanks to small pieces of auxiliary cables connected using a joint screwed to a metal plate. The metal plate's task is to make the direct connection with the carbon. The plates are placed during the beam lamination process and are in direct contact with the successive layers of carbon fibre used when laminating with the fibre glass layers that follow. The plates are cured in the normal blade curing process, therefore achieving a mechanically robust joint with a correct electrical connection with the carbon fibre.

The electrical connection can be additionally improved by the use of conductive resin on the area of the joint. The conductive resin to be used is based on a controlled mixture of resins commonly used in the manufacturing of wind turbine blades with nanofibres or nanotubes of carbon fibre. The addition of these carbon fibre nanofibres or nanotubes gives the initial resin electrical properties of various magnitudes which are different to its initial properties.

A particular embodiment of this resin contemplates the addition of a certain quantity of carbon nanofibres or nanotubes, preferably in a proportion of between 3 and 30%, to an epoxy type resin, commonly used in the manufacture of wind turbine blades. Afterwards, this conductive resin mixture is applied to the areas around the outer connection of the cable and the carbon laminate.

In the particular case where the connection to the carbon is made using the metal plates, the application of the nanocomposite based resin between the metal part and the carbon laminate to be connected, and to the area surrounding the connection during the lamination of the composed part, considerably improves the electrical properties of the connection, as it improves the way in which the current is transmitted from the metal part to each of the laminate's carbon fibres.

Another application for the conductive resin is its application to areas in which the decrease of the laminate's electrical resistance is required, for example, the application of the resin to the entire outer beam surface.

Another characteristic subject of the invention, is the correct determination of the radii in which the connections to the blade beam are arranged in order to facilitate a good electrical connection and to avoid any arcing due to induction phenomenon.

DESCRIPTION OF THE PREFERRED REALISATION

Figure 1:
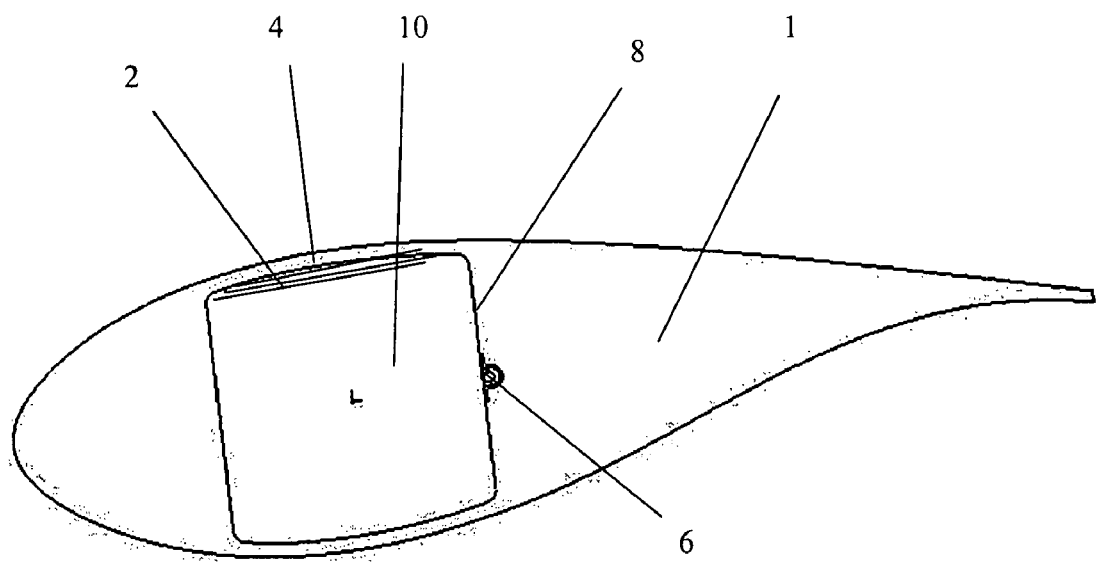
FIG. 1 shows the relative position between the carbon airfoils and the cable which travels through the interior of a blade section.

As shown in FIG. 1, the lightning protection system on blades (1) consisting of carbon fibre (2) laminates, which is the subject of the present invention, employs the lightning protection system based on a main cable (6) to which other derivations are added to connect it directly to the carbon fibre (2) laminates, using this method we ensure that both systems are equipotential.

Figure 2:
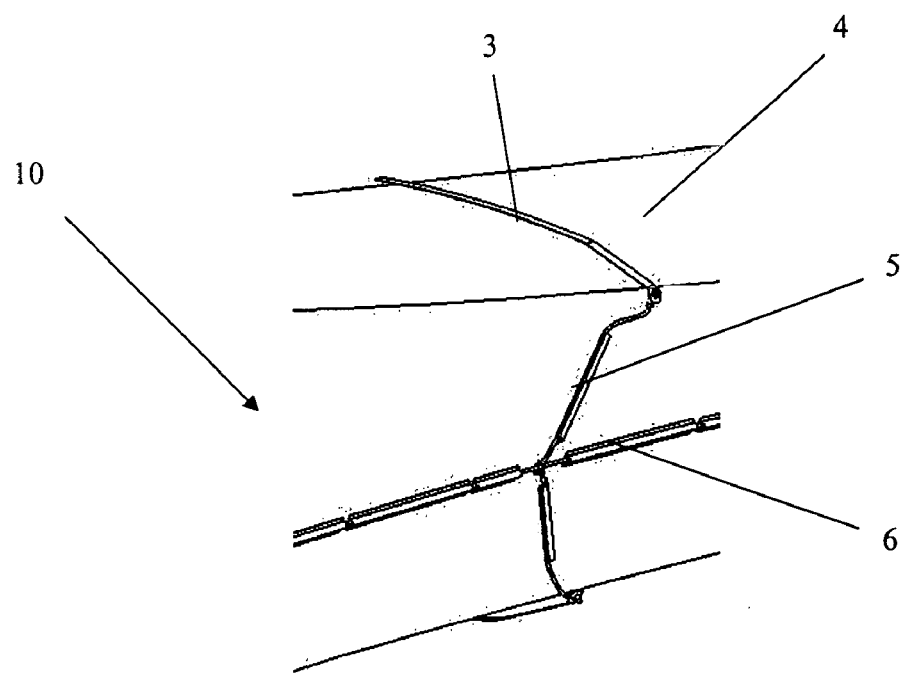
FIG. 2 shows the plate which makes the connection with the carbon fibre and the derivations using auxiliary cables.
Figure 3:
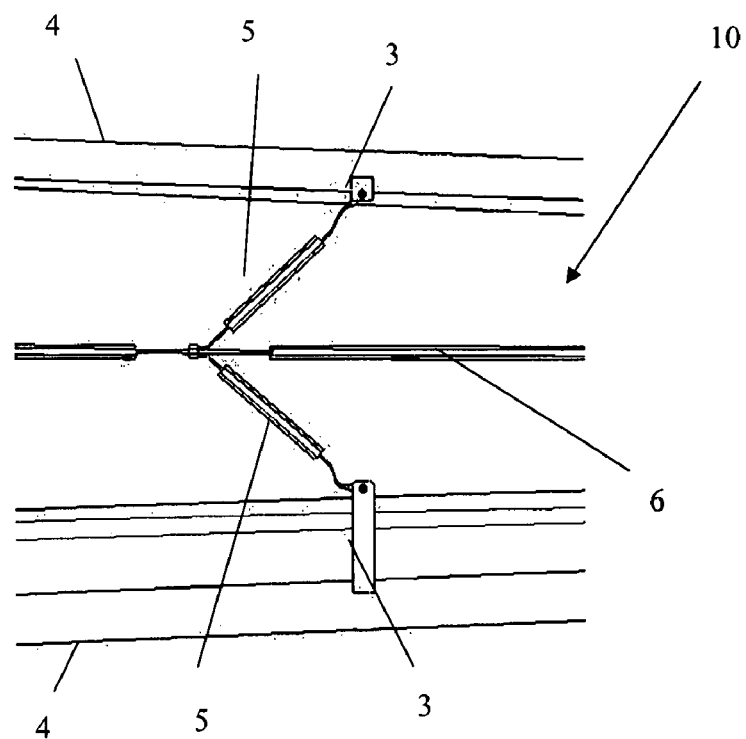
FIG. 3 shows in detail the connection between the plate and the carbon fibre and the auxiliary cable derivations to the main cable.

As shown in FIGS. 2 and 3, the derivations are made using two connections to each of the two carbon fibre (2) laminates, that on the upper part of the beam (10) and that on the lower part of the same, as shown in the previous figure. Said laminates are arranged on both sides which are facing the blade shells called airfoils (4). The connections are made, one in the beam root area and the other at the tip area, in such a way that the airfoils (4) of the beam become alternative lightning routes. The system used has a differentiating characteristic, which is the method of making the connections between the main cable (6) and the carbon (2) laminates, this is done using derivations from the main cable (6) thanks to small pieces of auxiliary cables (5) which are connected using a joint connected to a metal plate (3). The metal plate (3) is responsible for making the direct connection with the carbon (2). The plates (3) are situated during the beam lamination process onto the beam's layers of carbon fibre and are later covered with the fibre glass layers used in the beam lamination process that follows. The plates (3) are cured in the normal blade curing process therefore achieving a mechanically robust joint with a correct electrical connection to the carbon fibre (2). The electrical connection can be additionally improved using the conductive resin in the joint area as shown in FIG. 5.

Figure 4:
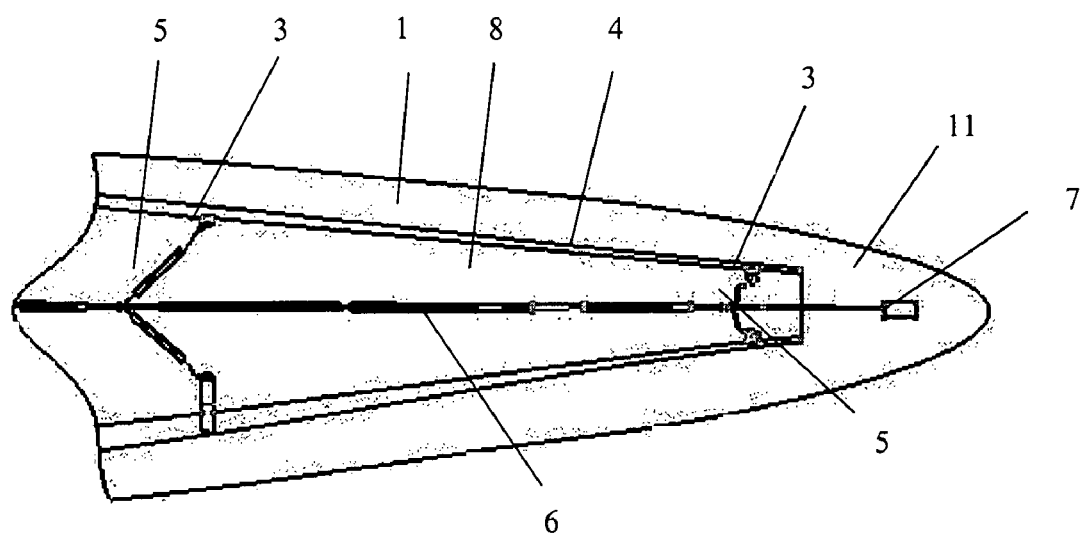
FIG. 4 shows a section of the blade in which all of the system components and the connections between them can be seen.

As shown in FIG. 4, the blade tip (11) incorporates a metal receptor (7) which extends via the main cable (6) along the length of the body (8) of the beam (10). As previously mentioned, the connections are made one at the beam root and the other at the tip area.

Figure 5:
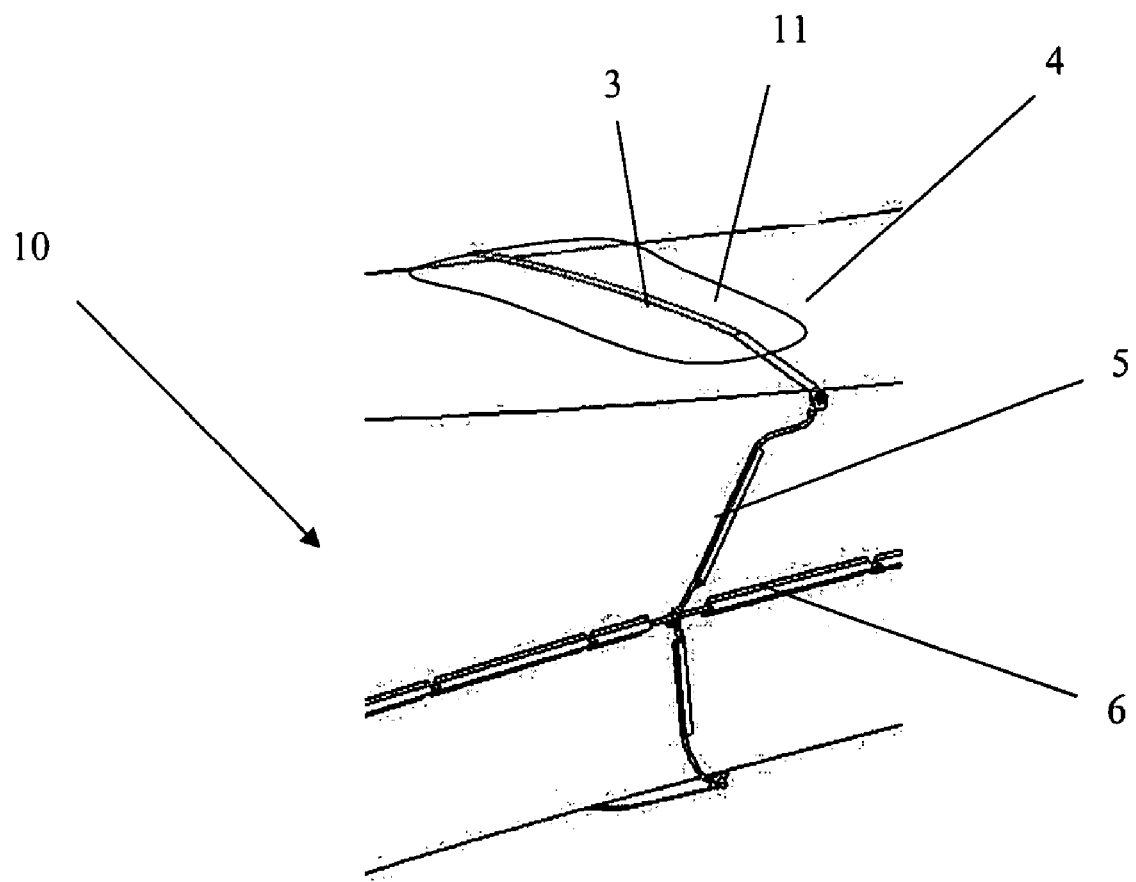
FIG. 5 shows the ideal area for applying the nanocomposite base conductive resin in order to achieve the best connection conductivity.

As shown in FIG. 5, the ideal way for improving the electrical characteristics of the joints consists of applying the conductive resin based on nanofibres or nanotubes of carbon (11) both between the plate and the last layer of carbon and on the areas surrounding the connection plate. Both the conductive resin and the plates (3) are cured in the normal blade curing process therefore achieving a mechanically robust joint with a correct electrical connection to the carbon fibre (2). The resulting connection has electrical properties which are considerably better than if the conductive resin had not been used.

In the case of a hybrid laminate which alternates layers of carbon fibre and layers of fibre glass, the equipotential between the different fibre glass and carbon layers is achieved thanks to windows, discontinuities or open spaces in the fibreglass layers of the hybrid laminate. Alternatively, the equipotential state can be obtained between the different layers of carbon fibres separated by fibres glass layers by using nanocomposite based conductive resin along all of the initially insulating fibre glass layer or in certain areas of the same, for example in the place where the windows were placed.

In a second practical embodiment of the invention, the equipotential state of the lightning protection systems is achieved using derivations from the main cable (6) and thanks to auxiliary cables (5) connected to metal pins, preferably cone shaped, which pass through the thin hybrid laminate of thin layers of fibre glass and carbon fibre in such a way that said pins establish the connections between all of the carbon fibre layers. In this case too, the electrical connection can be additionally improved using the conductive resin based on carbon nanofibres or nanotubes. This second embodiment also has the advantage that in the case of a hybrid laminate which alternates fibre glass layers and carbon fibre layers, the equipotential state between the different layers of carbon fibre is achieved thanks to the cone shaped pins, and therefore the provision of windows, discontinuities or spaces in the fibre glass layers is not necessary.

The invention claimed is:

1. Lightning protection system on wind turbine blades formed by a central structural beam and some airfoils with carbon fibre laminates which incorporates a main cable (6) in which the main cable (6) is equipotential with the carbon fibre laminates (2) at two locations of a blade (1), one at a tip (11) and the other at a blade root, using derivations from the main cable (6) via auxiliary cables (5) connected using a joint screwed to a metal plate (3) laminated in turn during the lamination process of the carbon fibre laminate (2) of the beam (10).

2. Lightning protection system on a wind turbine with carbon fibre laminates according to claim 1, wherein the connection between the auxiliary cable (5) and the carbon fibre layers (2) of the beam (10) comprises a metal pin, cone shaped, which establishes the electrical contact with the laminate.

3. Lightning protection system for wind turbine blades with carbon fibre laminates according to claim 1, wherein the plates (3) are responsible for the direct connection with the carbon fibre laminates (2) and are situated during the process of laminating the beam (10) of the blade, in contact with the carbon fibre (2) layers of said blade or beam (10) and later being covered with the following layers of fibre glass and cured at the same time as the laminates themselves.

4. Lightning protection system on wind turbine blades with carbon fibre laminates according to claim 1, wherein the equipotential connections to the carbon laminate incorporate a conductive resin around the area for connection to the carbon laminate comprising the plates and the pins.

5. Lightning protection system on wind turbine blades with carbon fibre laminates according to claim 1, wherein the carbon fibre laminates (2) of the beam (10) are integrated in a hybrid laminate with fibre glass and carbon fibre fabric, of which the equipotential state between the different layers of carbon fibre is achieved using windows, discontinuities, or open spaces in the fibre glass layers or by the application of conductive resins on the whole surface of the fibre glass layers or part of it.

6. Lightning protection system on wind turbine blades with carbon fibre laminates according to claim 1, wherein the outer surface of the laminate of the beam (10) is impregnated with conductive resin.

* * * * *

UNITED STATES PATENT AND TRADEMARK OFFICE
CERTIFICATE OF CORRECTION

PATENT NO.       : 7,729,100 B2                                        Page 1 of 1
APPLICATION NO.  : 11/663013
DATED            : June 1, 2010
INVENTOR(S)      : Jose Ignacio Llorente Gonzalez et al.

It is certified that error appears in the above-identified patent and that said Letters Patent is hereby corrected as shown below:

On the Title Page, Item (30)
Please insert foreign application priority data:    --ES 200502728 10 November 2005
    ES 200402847 11 November 2004--

Signed and Sealed this

Third Day of August, 2010

David J. Kappos
*Director of the United States Patent and Trademark Office*